June 17, 1952     H. J. NEEF     2,600,797
FISHING BUOY
Filed May 5, 1948
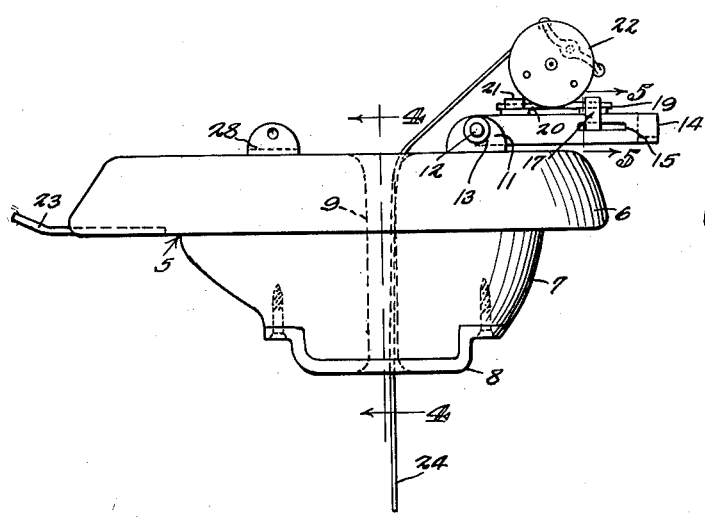
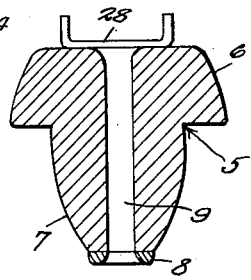
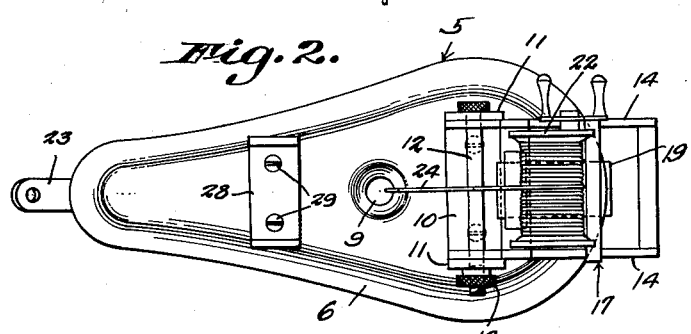
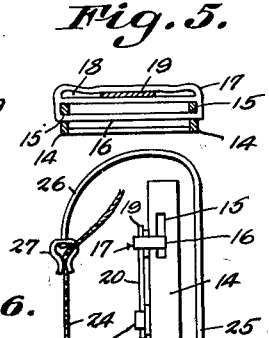
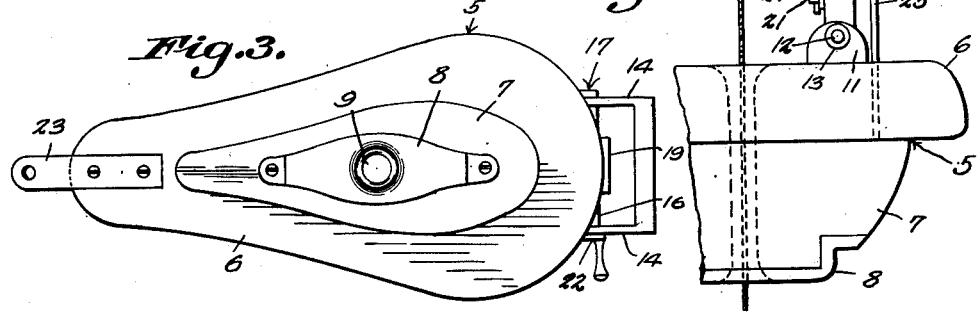
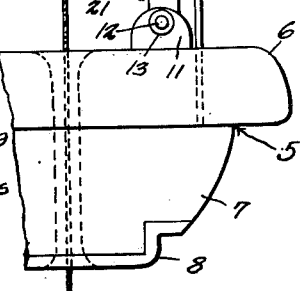
H. J. Neef
INVENTOR
BY C. A. Snow & Co.
ATTORNEYS.

Patented June 17, 1952

2,600,797

UNITED STATES PATENT OFFICE 2,600,797

FISHING BUOY

Henry J. Neef, Pardeeville, Wis.

Application May 5, 1948, Serial No. 25,229

1 Claim. (Cl. 43—43.11)

1

This invention relates to fishing buoys, the primary object of the invention being to provide a buoy which will act as a support for the fishing line and hook to support the fishing line and hook in deep water, the buoy having means for supporting a reel thereon, so that predetermined lengths of line may be released on which the hook is secured, thereby adapting the device for use in deep water or shallow fishing.

An important object of the invention is to provide a buoy, of a particular construction which will permit the buoy to ride the waves thereby lending a bobbing motion to the buoy to attract fish to the baited hook supported by the buoy.

Another object of the invention is to provide means whereby the reel may be supported at various positions on the buoy, for convenience in operation.

Still another object of the invention is to provide a bracket for supporting the reel in such a way that the reel may be swung from a position adjacent to the upper surface of the buoy, to an upright position above the upper surface of the buoy to bring the line directly over the opening of the buoy through which the line extends, to insure against binding, when the device is used in fishing through a hole in the ice.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1 is a side elevational view of a buoy constructed in accordance with the invention, illustrating a fishing line as mounted thereon.

Fig. 2 is a plan view thereof.

Fig. 3 is a bottom plan view of the buoy.

Fig. 4 is a sectional view taken on line 4—4 of Fig. 1.

Fig. 5 is a sectional view taken on line 5—5 of Fig. 1.

Fig. 6 is a fragmental elevational view illustrating a modified form of the invention.

Referring to the drawing in detail, the buoy comprises a body portion indicated generally by the reference character 5, the body portion having an enlarged upper section 6 and a lower weighted section 7 weighted by means of the metal bar 8 which is formed with an opening that aligns with the bore 9 extending vertically through the body portion, as shown by Fig. 4 of the drawing.

The reference character 10 indicates a substantially U-shaped bracket providing ears 11 which are formed with openings to accommodate the shaft 12 which shaft is provided with a

2 threaded end on which the knurled nut 13 is provided.

The ears 11 of the bracket 10, cooperate with the side bars 14 of the reel support which side bars are also provided with openings that align with the openings of the ears 11 in receiving the shaft 12. By this construction, it will be seen that a slight unwinding of the knurled nut 13 allows the side bars 14 of the reel support to be loosened and swung from the horizontal position shown by Fig. 1 of the drawing wherein the body portion is held within the hand for hand fishing, to the vertical position as shown by Fig. 6 of the drawing, for various types of fishing, as for example fishing through the ice, or from the water surface, where the buoy is used as a line-supporting float. The knurled nut is then tightened on the shaft 12 to secure the side bars in adjusted position.

The bars 14 are provided with slots 15 elongated longitudinally of the side bars, which slots receive the bar 16 of the movable clamp 17 which is provided with the transverse slot 18 to receive the end 19 of the reel support 20, the forward end of the reel support 20 being positioned under the strap 21 that forms a part of the reel support.

Thus it will be seen that when it is desired to remove the reel which in the present showing is indicated by the reference character 22, it is only necessary to slide the clamp 17 rearwardly to disengage the end 19 of the reel support. The reel may now be slid from its position under the strap 21 and removed.

Secured to the forward end of the body portion, which tapers towards the front end of the device, is a tow bar 23, by means of which the buoy may be towed during fishing.

The fishing line is indicated by the reference character 24 and carries the usual fishing hook, not shown, at the lower end thereof. The line is also supplied with the necessary weight to hold the hook to the proper depth within the water during fishing.

Because of the construction of the device, it will be obvious that various lengths of line may be released so that the hook will be supported within the water at the desired level, it being necessary to vary the position of the hook within the water, according to whether the fish are running deep or shallow.

As shown by Fig. 6 of the drawing, an arm 25 is provided which arm is constructed preferably of heavy wire material with one end thereof extended into an opening of the body portion 5. The opposite end of the arm 25 extends laterally and downwardly providing the curved extension 26 which has a pair of spring fingers 27 formed at the free end thereof, through which the fishing line 24 extends, the fishing line running from the reel which would be mounted on the reel support secured on the body portion.

The reference character 28 indicates a forward bracket which is secured to the body portion by means of the screws 29, and affords means whereby a reel may be supported at this point on the body portion should it be desired to do so, for various reasons.

From the foregoing it will be seen that due to the construction shown and described, I have provided a fishing buoy which may be used in deep water or shallow fishing, and may be towed or moved to various locations.

With this fishing buoy, the fishing line may be extended through the central opening of the buoy and held at a predetermined depth, the buoy acting as a float.

Due to the tapered forward end of the buoy, it is obvious that the waves will cause the buoy to rock moving the fishhook secured to the lower end of the fishing line to attract the fish.

It might be further stated that in constructing the body portion, any suitable material may be used, such as wood, cork or the like.

Having thus described my invention, what is claimed is:

A fishing buoy comprising a flat body including an upper section and an integral weighted lower section depending a substantial distance below the upper section, said body having a line opening extending vertically through the center thereof, a bracket secured to the upper surface of the flat body, said bracket being disposed adjacent to the line opening and including upstanding ears, a reel support embodying side bars pivotally mounted between said upstanding ears, a fishing line reel mounted on the side bars, said reel support adapted to swing to a vertical position with the line of the reel in a direct vertical line with said line opening of the body, the line being extended vertically through the line opening, and means for securing the reel support in either a horizontal or vertical position on the body portion.

HENRY J. NEEF.

REFERENCES CITED

The following references are of record in the file of this patent:

UNITED STATES PATENTS

| Number | Name | Date |
|---|---|---|
| 270,358 | Aldrich | Jan. 9, 1883 |
| 391,497 | Whitten | Oct. 23, 1888 |
| 541,789 | Kunzelman | June 25, 1895 |
| 1,512,656 | Ward | Oct. 21, 1924 |
| 1,653,400 | Jeffries | Dec. 20, 1927 |
| 1,708,755 | Dierksmier | Apr. 9, 1929 |
| 1,973,028 | Thomas | Sept. 11, 1934 |
| 2,193,404 | Goertzen | Mar. 12, 1940 |
| 2,374,752 | Johnson | May 1, 1945 |